United States Patent
Okano

(10) Patent No.: US 11,058,988 B2
(45) Date of Patent: Jul. 13, 2021

(54) VENTILATING AIR CONDITIONING APPARATUS

(71) Applicant: SEIBU GIKEN CO., LTD., Fukuoka (JP)

(72) Inventor: Hiroshi Okano, Fukuoka (JP)

(73) Assignee: SEIBU GIKEN CO., LTD., Fukuoka (JP)

( * ) Notice: Subject to any disclaimer, the term of this patent is extended or adjusted under 35 U.S.C. 154(b) by 338 days.

(21) Appl. No.: 16/229,728

(22) Filed: Dec. 21, 2018

(65) Prior Publication Data
US 2019/0193019 A1 Jun. 27, 2019

(51) Int. Cl.
*B01D 53/06* (2006.01)
*F24F 3/16* (2021.01)
(Continued)

(52) U.S. Cl.
CPC .......... *B01D 53/06* (2013.01); *B01D 53/025* (2013.01); *B01D 53/343* (2013.01); *B01D 53/62* (2013.01);
(Continued)

(58) Field of Classification Search
CPC .... B01D 53/025; B01D 53/06; B01D 53/343; B01D 53/62; B01D 2251/606; B01D 2252/204; B01D 2253/102; B01D 2253/206; B01D 2253/25; B01D 2253/304; B01D 2253/3425; B01D 2257/504; B01D 2257/708; B01D 2257/90; B01D 2258/06;
(Continued)

(56) References Cited

U.S. PATENT DOCUMENTS

| 3,865,924 | A | * | 2/1975 | Gidaspow | .............. | B01D 53/02 |
| | | | | | | 423/230 |
| 10,406,475 | B2 | * | 9/2019 | Okano | ................... | B01D 53/06 |

(Continued)

FOREIGN PATENT DOCUMENTS

| JP | 5-68290 | 9/1993 |
| JP | 2003-19435 | 1/2003 |

(Continued)

OTHER PUBLICATIONS

U.S. Appl. No. 16/051,551, filed Aug. 1, 2018, Hiroshi Okano, Seibu Giken Co., Ltd.

*Primary Examiner* — Frank M Lawrence, Jr.
(74) *Attorney, Agent, or Firm* — Staas & Halsey LLP

(57) ABSTRACT

An energy-efficient, space-saving, low-cost, waste-heat-utilizing ventilating air conditioning apparatus uses a honeycomb rotor having a function of adsorbing or absorbing contaminants such as carbon dioxide and VOC gas. The honeycomb rotor is disposed in a rotor rotating device having at least a processing zone and a re-generation desorption zone. Air to be processed is passed through the processing zone to remove contaminants such as carbon dioxide to produce supply air. Water is directly sprayed or dropped into a heat exchanger provided at an entrance of the re-generation desorption zone to evaporate the generated water film by heating. The generated saturated steam is introduced for desorbing carbon dioxide and pollutants, and the stream is discharged the stream outdoors. The ventilating air conditioning apparatus can operate without the energy loss associated with ventilation.

16 Claims, 14 Drawing Sheets

(51) Int. Cl.
*B01D 53/62* (2006.01)
*B01D 53/02* (2006.01)
*B01D 53/34* (2006.01)
*F24F 3/14* (2006.01)
*F24F 7/06* (2006.01)
*B01D 53/72* (2006.01)
*F24F 3/12* (2006.01)
*F24F 8/117* (2021.01)

(52) U.S. Cl.
CPC ............... *B01D 53/72* (2013.01); *F24F 3/12* (2013.01); *F24F 3/14* (2013.01); *F24F 7/06* (2013.01); *B01D 2251/606* (2013.01); *B01D 2252/204* (2013.01); *B01D 2253/102* (2013.01); *B01D 2253/206* (2013.01); *B01D 2253/25* (2013.01); *B01D 2253/304* (2013.01); *B01D 2253/3425* (2013.01); *B01D 2257/504* (2013.01); *B01D 2257/708* (2013.01); *B01D 2257/90* (2013.01); *B01D 2258/06* (2013.01); *B01D 2259/4009* (2013.01); *B01D 2259/4508* (2013.01); *F24F 8/117* (2021.01)

(58) Field of Classification Search
CPC ..... B01D 2259/4009; B01D 2259/4508; F24F 3/12; F24F 3/14; F24F 7/06; F24F 2003/1617; Y02A 50/20; Y02C 20/40

USPC ..... 423/230; 96/125, 145; 95/113, 139, 141, 95/148

See application file for complete search history.

(56) References Cited

U.S. PATENT DOCUMENTS

| | | | |
|---|---|---|---|
| 2001/0009124 A1* | 7/2001 | Suzuki | B01D 53/06 95/113 |
| 2012/0000365 A1* | 1/2012 | Okano | B01D 53/06 96/144 |
| 2012/0068119 A1* | 3/2012 | Kametani | B01D 53/261 252/372 |
| 2014/0175336 A1* | 6/2014 | Gupta | B01D 53/06 252/373 |
| 2015/0010452 A1* | 1/2015 | Elliott | B01D 53/06 423/230 |

FOREIGN PATENT DOCUMENTS

| | | | |
|---|---|---|---|
| JP | 2005-98571 | | 4/2005 |
| JP | 2006-61758 | | 3/2006 |
| JP | 2007-37670 | | 2/2007 |
| JP | 5627870 | | 10/2014 |
| JP | 5877922 | | 2/2016 |
| JP | 2016-117052 | * | 6/2016 |

* cited by examiner

VENTILATING AIR CONDITIONING APPARATUS

CROSS-REFERENCE TO RELATED APPLICATIONS

This application is based on and hereby claims priority to Japanese Patent Application No. 2017-247165 filed Dec. 25, 2017, the contents of which are hereby incorporated by reference.

BACKGROUND

The inventor's proposal relates to a ventilating air conditioning apparatus for removing contaminants such as carbon dioxide etc. using a rotor which can remove, for example, contaminants such as carbon dioxide, VOC, odor and the like generated in a room or contaminants such as SOx, NOx, VOC or the like entering from outside. In detail, the present invention can raise indoor air quality with less ventilation by removing these contaminants using low-temperature waste heat.

As shown in FIG. 1, ventilation air conditioners used for business buildings, commercial buildings and living spaces are mainly intended for the purpose of discharging pollutants such as carbon dioxide contained in human breath and VOCs generated from building materials, office automation equipment, etc. When ventilating during cooling and heating, as the cooling and heating load increases, exhaust heat is recovered by exchanging the return air and the exhaust air by using the total heat exchanger in the middle of the ventilation duct.

As such a total heat exchanger, a rotor type and a stationary type are mainly used. When the exhaust air quantity ratio is 1:1, in the case of the rotor type, the total heat exchange efficiency is 70%, and in the compact stationary type, the total heat exchange efficiency is about 50%. That is, even if energy that is discarded by total heat exchange is recovered, 30 to 50% of its energy is wastefully discarded. Also, such a total heat exchanger has a disadvantage of unnecessarily occupying the expensive valuable space of a building since a large duct is required for each of the air supply system and the exhaust system. Furthermore, when the exhaust location is far, the duct piping becomes longer. Therefore, the construction cost also increases. In addition, such total heat exchangers increase energy consumption due to an increase in power for blowing air, and this also restricts installation location.

Also, recent houses have independent air-conditioning facilities in each room, a ventilating fan is provided for each room, and ventilation is performed through ducts passed from the respective ventilators to the ceiling back side. In such a duct, the duct itself may be a long pipeline, and in such a case, the air resistance is large. Therefore, in such a duct, energy required for ventilation also increases. This is a wasteful use of energy by ventilation, and overall energy efficiency drops.

SUMMARY

As to the above problem, as disclosed in Patent Document 1, Japanese Patent Publication No. 2005-98571, a ventilator operated when the concentration of carbon dioxide in a room becomes a certain value or more has been developed. However, this still does not sufficiently reduce the loss of cooling and heating energy accompanying ventilation.

For this purpose, as described in Patent Document 2, Japanese Patent Publication No. 2007-37670, a deodorizing apparatus having a filter for adsorbing and decomposing harmful gas in the air has been developed. However, this type of apparatus can not remove carbon dioxide, and since it is necessary to replace the filter, there is a problem that a filter replacement cost is separately applied.

Patent Document 3, Japanese Patent Publication No. 2003-19435, discloses an apparatus sorbs carbon dioxide from indoor air using an adsorption rotor carrying an absorbent such as potassium oxide capable of sorption and desorption of carbon dioxide, absorbs carbon dioxide by warm air in a re-generation zone, and then exhausts the carbon dioxide outdoors.

Patent Document 4, Japanese Patent No. 2006-61758, discloses an apparatus using a sorption rotor in which an ion exchange resin or a complex having a functional group that selectively sorbs and desorbs carbon dioxide is supported. The apparatus sorbs carbon dioxide from indoor air, desorbs carbon dioxide with hot air in the re-generation zone and then exhausts it outdoors.

However, in principle, the carbon dioxide sorption apparatuses disclosed in these documents adsorb and remove carbon dioxide as well as water vapor. Since it is humid in summer, it is convenient if indoor air can be dehumidified. However, when dehumidifying in the intermediate or winter season, indoor air is too dry and must be humidified. Therefore, the sorption apparatus described above has a problem that there is no merit of use in the season other than the summer season.

Furthermore, this apparatus has the problem of heat resistance in the carbon dioxide adsorbent and the rotor. Since this apparatus has low energy density for energy saving purpose at 40 to 80° C. (hereinafter all temperatures are referred to as "Celsius", it is necessary to take in and exhaust the same amount of re-generation air as the amount of air to be processed in order to achieve the required performance. Therefore, since this apparatus requires a relatively large rotor, this apparatus has disadvantages that the rotor occupies a wide installation space and the cost of the rotor is high. In addition, this apparatus requires large ducts for both re-generation air intake and for exhaust. Therefore, this apparatus has a disadvantage of unnecessarily occupying the expensive valuable space of the building. Also, in this apparatus, when the outside air intake and discharge are not easy, the duct pipe becomes longer. Therefore, in this case, the construction cost also increases. Furthermore, this apparatus has problems such as an increase in power for blowing, and its installation location is also restricted.

Patent Document 5, Japanese Patent Publication No. 5-68290, discloses an example of a carbon dioxide removing apparatus used in a closed space of a space station or the like. In this apparatus, air to be processed is caused to flow through an adsorption layer filled with an adsorbent (amine type ion exchange resin, activated carbon, etc.), and carbon dioxide in the air to be processed is removed to be supplied.

Further, in this apparatus, by switching the valve, water vapor is introduced into the packed bed of the adsorbent which adsorb carbon dioxide to desorb carbon dioxide. In addition, as this apparatus is operated in a batch type, after the desorption is completed, the valve is switched again to introduce the treated air, adsorb carbon dioxide, and supply the air from which the carbon dioxide has been removed. Although this method is effective for a small space such as a space station, it is difficult to adapt for general air conditioning because of its high initialization cost, its running cost and its difficulty of enlargement.

Patent Document 6, Japanese Patent No. 5627870, discloses an apparatus using a honeycomb rotor carrying a powder of a adsorptive material such as an ion exchange resin capable of adsorbing carbon dioxide so as to be adaptable also to general air conditioning. As shown in FIG. 2, on the process air side of the apparatus, air cooled and dehumidified by passing through an evaporator of the heat pump is passed through the honeycomb rotor. Thus, in this apparatus, contaminants such as carbon dioxide are adsorbed and removed, and then air is supplied. Meanwhile, in the re-generation zone, by passing air which has been heated through the condenser, contaminants such as carbon dioxide adsorbed on the rotor are desorbed and discharged to outside air. By using the honeycomb rotor as described above, it is possible to process a large amount of air, and also by using a heat pump in combination with the heat pump, energy saving is secured.

Patent Document 7, Japanese Patent Publication No. 5877922, discloses an example in which a humidity adjusting mechanism is provided so that the enthalpy at the entrance of re-generation is higher than the enthalpy at the entrance of processing, thereby improving the separation efficiency of carbon dioxide. However, in either of the apparatuses of Patent Document 6 and Patent Document 7, by using air that uses low-temperature waste heat having a low re-generation effect, attempts are made to supplement for the shortage of re-generation energy with the re-generation air flow rate. Therefore, in these apparatuses, approximately the same amount of air for re-generation and desorption as the air to be processed is required. As shown in Table 1, since the rotor diameter is increased, it is difficult to downsize the entire device, and since two large air flow blowers are required, the air running cost also increases. Furthermore, since this apparatus requires air supply and exhaust ducts for large-area in re-generation and desorption, it has a disadvantage of taking up more valuable space of the building.

TABLE 1 comparison of rotor diameter to processing flow rate

|  | Old $CO_2$ removal method | (flow rate: N m3/h) $CO_2$ removal method of the present invention |
|---|---|---|
| Zone ratio processing:re-generation | 1:01 | 1:(0.1) |
| processing air volume | 30,000 | 30,000 |
| re-generation air volume | 30,000 | — |
| hopper air volume | — | 70 to 900 |
| total air volume | 54,000 | 30,900 |
| re-generation temperature | −60 | −60 - |
| rotor diameter conversion | 3.0 m | 2.1 m |

Any carbonate such as zeolite, activated carbon, amine compound, amine type ion exchange resin, potassium carbonate or the like which is carbon dioxide adsorptive or adsorptive material has hygroscopicity. Also, usually, the relative humidity of air for re-generation and desorption is lowered by heating. Thus, moisture of the rotor is desorbed in the re-generation zone, and the passing air is dehumidified in the processing zone. In summer, there is also the merit of dehumidifying. However, since the supply air temperature rises due to the adsorption heat of dehumidification, there is a disadvantage that it cannot be supplied to the room unless it is re-cooled by vaporization cooler or an after-cooler provided at the rotor processing outlet.

In addition, due to the temperature rise due to adsorption heat of dehumidification, the sorption performance of carbon dioxide tends to be inhibited as shown in FIG. 6, and in the desorption/re-generation zone, re-generation energy is consumed for the heat of desorption of water vapor, there is also a disadvantage in terms of performance that the separation performance of carbon dioxide deteriorates.

Furthermore, since humidification is required rather in the winter season, this dehumidification function is disadvantageous. Also, as there is no extra exhaust heat, we cannot operate in winter. That is, there is a fundamental disadvantage that it can be utilized only in the summer.

In order to solve the above problem, Patent Document 8, Japanese Patent Application No. 2017-149419 filed Aug. 1, 2017 related to U.S. application Ser. No. 16/051,551 filed Aug. 1, 2018, discloses an apparatus having a honeycomb rotor including adsorption function or absorption function of contaminants such as carbon dioxide and VOC gas in a wet state. In this apparatus and method, purification is performed by removing carbon dioxide and contaminants in the air, and in the desorption/re-generation zone, the air is regenerated with saturated steam at about 40 to 80° C.

With this method, indoor air quality can be secured while suppressing energy loss with a minimum amount of ventilation. Also, since it is desorbed and regenerated with a small amount of saturated steam, it is possible to drastically reduce the size of the rotor and the device as shown in Table 1. Also, it is configured to perform energy saving not only in the summer but also in the winter, depending on whether purging exhaust the total heat stored in the honeycomb immediately after re-generation or recovering to the supply side without purging exhaust.

However, in order to generate saturated steam to be supplied to the desorption/re-generation zone, conventional pan steam generators or steam humidifiers require expensive electric energy or pressurized steam. Also, in vaporized ultrasonic humidifiers, putt type humidifiers and spray humidifiers, the air temperature will drop. Therefore, even if they are combined with an air heater and if heating after humidification and humidification after heating are repeated, excessive circulation processing is necessary as shown in FIG. 14. That is, it is impossible in practice to make saturated steam at 60° C. by utilizing low-temperature waste heat.

In order to solve the above problems, the inventor proposes a honeycomb rotor having adsorption function or absorption function of contaminants such as carbon dioxide and VOC gas in a wet state. This rotor removes and purifies carbon dioxide and contaminants in the air. Also, in the proposed apparatus, saturated steam for desorption and re-generation is generated by utilizing low-temperature waste heat of 100° C. or less. Further, in the proposed apparatus, a hot water coil of low-temperature waste heat or a heat radiation coil of a heat pump is provided on the desorption/re-generation inlet side, water is directly sprayed or dropped on the coil to generate a water film on the heat transfer surface, and saturated steam is generated by heating and evaporating the water film on the heat transfer surface.

Since the proposed ventilating air conditioning apparatus is configured as described above, contaminants such as carbon dioxide and odor and VOC generated inside the room, and VOC, SOx, NOx entering from the outside air are also adsorbed (adsorbed) to the honeycomb rotor at the same time, these are desorbed with saturated steam in desorption zone and released to outside air. Thus, according to the proposals, since the indoor air quality can be maintained even if the ventilation amount is reduced, the air conditioning energy can be reduced.

This apparatus has a hot water coil or a heat radiation coil of a heat pump on the desorption/re-generation inlet side. Water is directly sprayed or dropped on the coil to generate a water film on the heat transfer surface. By heating and evaporating the water film on the heat transfer surface, saturated steam is generated to desorb and regenerate. This makes it possible to utilize hot water of low-temperature exhaust heat or exhaust heat of the heat pump, thereby further improving energy saving performance.

The allowable value of the concentration of carbon dioxide is said to be 0.1% by the Building Standard Law (tolerance 0.5% by the National Occupational Health and Safety Institute and the US Industrial Sanitation Experts Meeting), just slightly increasing in the air will affect human health. Therefore, according to the design standard of the Building Standards Law, ventilation of 30 m 3/H per person in a room is required. However, in recent years, the concentration of carbon dioxide in the outside air has gradually increased, and with the ventilation of 30 m 3/H, the indoor carbon dioxide concentration of 0.1% cannot be achieved.

The main purpose of ventilation is to exhaust VOC generated from building materials, furniture, office automation equipment, etc. and the pollutants generated by smoking so that those concentrations are made lower. Therefore, even if the ventilation volume of 30 m 3/H or less can be maintained below the reference value by discharging pollutants such as carbon dioxide and VOC from inside the building, there is no problem regarding the operation standard of the building standards law.

Furthermore, the proposed method and apparatus use a honeycomb rotor having adsorptive action and desorbing action of contaminant gases such as carbon dioxide and VOC. Thus, the method and the apparatus do not include frequently exchanged members such as an air purification apparatus using a filter. Therefore, with the proposal, expenditure for expendable item replacement can be reduced.

Especially in recent years, air pollution has occurred one after another in urban areas of each country. In such a case, it is concerned that PM 2.5, SOx, NOx, VOC, photochemical smog enter the room by performing ventilation. Also, there is a possibility that the exhaust gas of the automobile along the main road and the odor due to the cooking exhaust gas enter the room due to ventilation in the downtown area. However, since the proposed ventilating air conditioning apparatus has a small amount of ventilation, the contaminants can be removed with a small high-performance outside air filter. Even if contamination enters, adsorption, concentration, and exhaust can be realized by the proposed apparatus.

BRIEF DESCRIPTION OF THE DRAWINGS

These and or/other aspects and advantages will become apparent and more readily appreciated from the following description of the embodiments, taken in conjunction with the accompanying drawings of which.

DETAILED DESCRIPTION OF THE PREFERRED EMBODIMENTS

Figure 1:
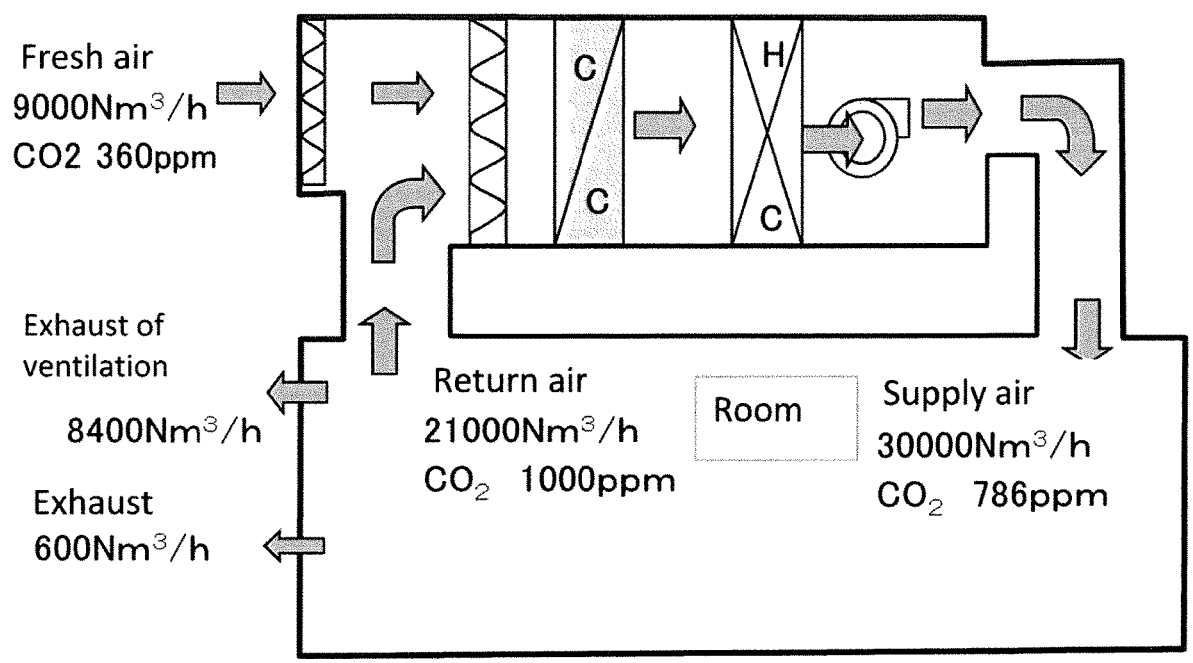
FIG. 1 shows a flow figure of a related art ventilation air conditioner.
Figure 2:
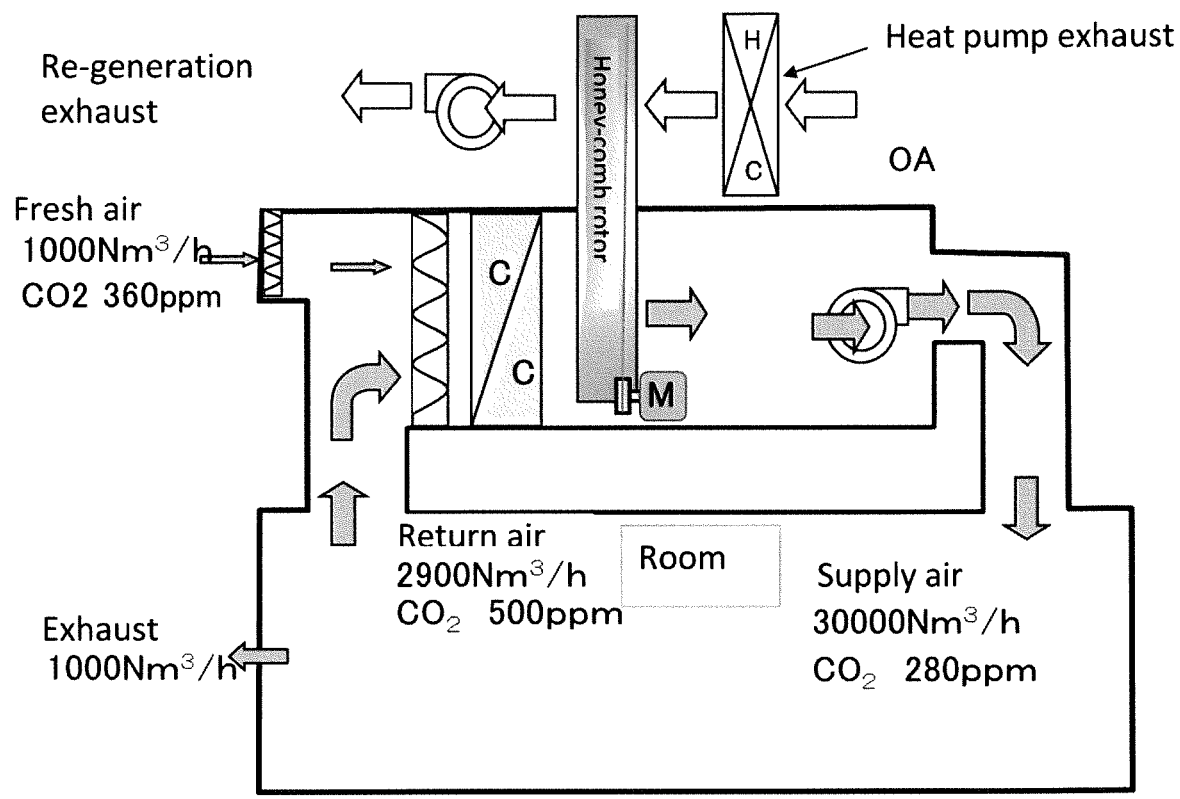
FIG. 2 shows a flow figure of a related art ventilation air conditioner according to Patent Document 6.

Reference will now be made in detail to the embodiments, examples of which are illustrated in the accompanying drawings, wherein like reference numerals refer to the like elements throughout. The embodiments are described below to explain the present invention by referring to the figures.

The apparatus proposed by the inventor has a honeycomb rotor having adsorption function or sorption function of contaminants such as carbon dioxide and VOC gas in a wet state. In the proposed apparatus, the honeycomb rotor is disposed in a rotor rotating device including at least a processing zone and a desorption/re-generation zone. The characteristic of the proposal is that air to be processed is passed through the processing zone to remove contaminants such as carbon dioxide and the processed air is supplied and saturated steam is introduced into the desorption/re-generation zone to desorb carbon dioxide and contaminants to discharge it outdoors.

The adsorption phenomenon and the absorption phenomenon are different phenomena, but are similar phenomena. If both elements of phenomena occur, sometimes the term sorption is used. In this document, the term "sorption" is used. When a polymer gel or an ion exchange resin having an amine group is hydrated, it becomes a gel in which pores filled with water are present. They are considered to be adsorbents that carbon dioxide sorbs to amine groups on the pore surface by diffusing in the pores. Resins processed into porosity for the purpose of improving the exchange rate also exist. An adsorbent obtained by impregnating an absorbent such as a solid amine or an ionic liquid into the pores of the porous solid adsorbent is also included therein. In any case, however, the main point is that, in the operating principle, a honeycomb rotor incorporating small-diameter particles having the function of adsorbing pollutants such as carbon dioxide in a water-insoluble solid state in a wet state.

Figure 8:
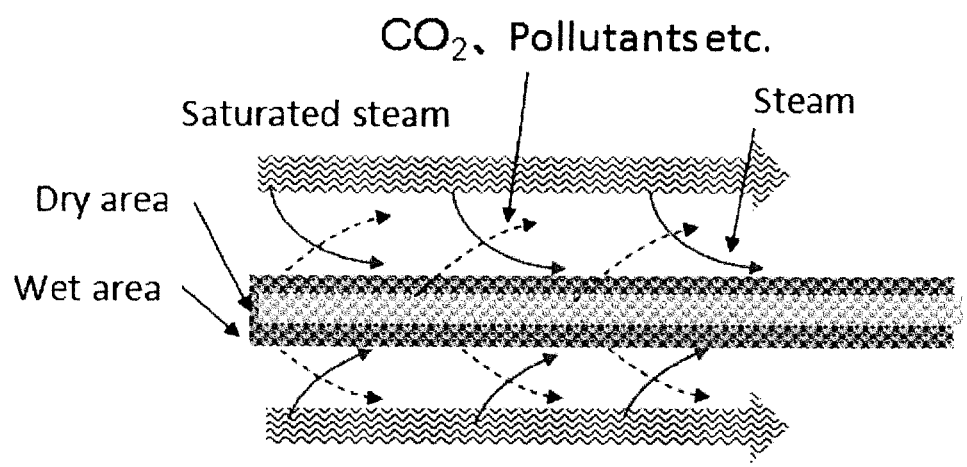
FIG. 8 shows the honeycomb surface at the time of desorption and reproduction of saturated vapor.

When processing air is made to flow through the processing zone of the honeycomb rotor, the honeycomb removes contaminants such as carbon dioxide and supplies clean air. A rotor honeycomb having adsorbed contaminants such as carbon dioxide moves to the desorption/re-generation zone by the rotation of the rotor and desorbs contaminants such as carbon dioxide by introducing saturated steam. Saturated steam is generated by spraying or dropping water directly on a coil provided at the inlet of the desorption zone to generate a water film on the heat transfer surface and evaporating the water film by heating. As shown in FIG. 8, the saturated water vapor introduced into the rotor honeycomb from the desorption/re-generation zone is cooled by heating of the honeycomb or desorption heat supply of contaminants such as carbon dioxide to absorb moisture or condense on the inner surface of the honeycomb. In the proposed apparatus, rotation of the rotor moves the inner surface of the honeycomb to the treatment zone while remaining wet. However, in the apparatus, when the process air passes through, the cooling of the honeycomb is promoted by the vaporization cooling phenomenon of water, and the sorption heat of the carbon dioxide gas is removed by cooling. Thus, in the apparatus, the honeycomb exhibits the effect of being able to sorb carbon dioxide gas and contaminant gas with high efficiency.

Figure 9:
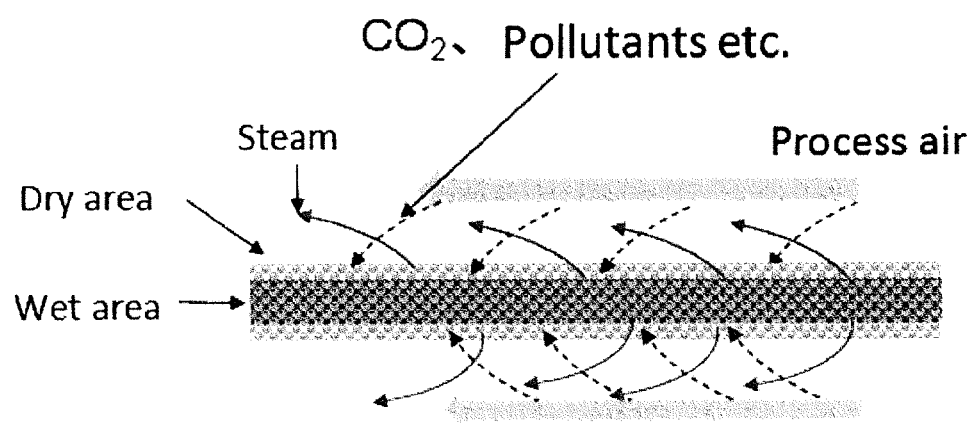
FIG. 9 shows the honeycomb surface at the time of evaporative cooling sorption.

Furthermore, in the apparatus, it is possible to reduce desorption air volume and ventilation air volume by concentrating, desorbing, and exhausting contaminated gases such as carbon dioxide and VOC with saturated steam at a low capacity of 40 to 100° C. at high energy density. For example, as shown in FIG. 9, the saturated steam at 60° C. has enthalpy of ten-fold multiple than the enthalpy for heating air at 35° C. and 50% RH to 60° C. Therefore, saturated steam can be desorbed and regenerated at a fraction of one tenth. Furthermore, as shown in Table 1, the rotor can be downsized, the exhaust can also be taken in to considerably reduce the outside air, and the duct of the supply system and the exhaust system can also be the minimum of the Building Standards Law. In terms of operation, if the indoor air quality can be secured, the amount of ventilation can be reduced to a large extent so that the blowing energy is reduced. Also, the cooling and heating energy is not lost by the ventilation of the large air volume, and the energy saving property is improved. Even if exhaust heat is recovered by the total heat exchanger, 30 to 50% of energy cannot be recovered but lost. However, in the ventilating apparatus, by consolidating and exhausting pollutants such as carbon dioxide and VOC in the room, an energy saving effect exceeding the total heat exchanger is expected.

Here, saturated steam is basically atmospheric pressure of 40 to 100° C. or less. Energy saving can be further improved because warm water of low temperature waste heat or condenser heat of condenser of heat pump can be used. The saturated steam which has been introduced into the desorption/re-generation zone is cooled by heating of the honeycomb or desorption heat supply of carbon dioxide to absorb moisture or condense on the honeycomb surface. In the apparatus, the surface of the honeycomb moves to the processing zone by rotation of the rotor while moisture is absorbed or moisture condensed, the cooling of the honeycomb is promoted by the evaporation cooling phenomenon of water due to the passage of the air to be processed, and by removing and cooling the sorption heat of carbon dioxide gas, carbon dioxide gas and pollutant gas in the air to be processed can be efficiently adsorbed. In other words, the proposed device utilizes high enthalpy due to saturated steam instead of displacement by desorption with steam.

As the solid water insoluble amine type carbon dioxide adsorbing material, in addition to a basic ion exchange resin having an amine group, a polymer gel having an amine group, or an adsorbent such as silica gel, activated carbon, activated alumina, mesoporous silica or the like in which an amine type carbon dioxide absorbent or a carbon dioxide absorbent such as carbonate or ionic liquid is impregnated in the pores can be used.

Figure 13:
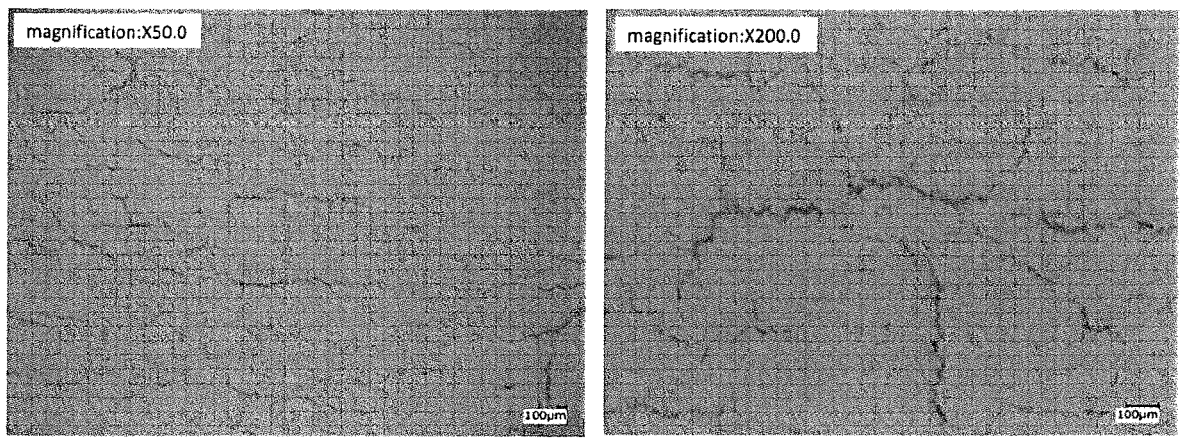
FIG. 13 shows a microphotograph of the sheet surface which coated the porous glass fibrous sheet with the slurry which mixed the minute particles and binder of 0.1 mm or less of weakly basic ion-exchange resin, and was used as a sheet of 1 mm or less.
Figure 14:
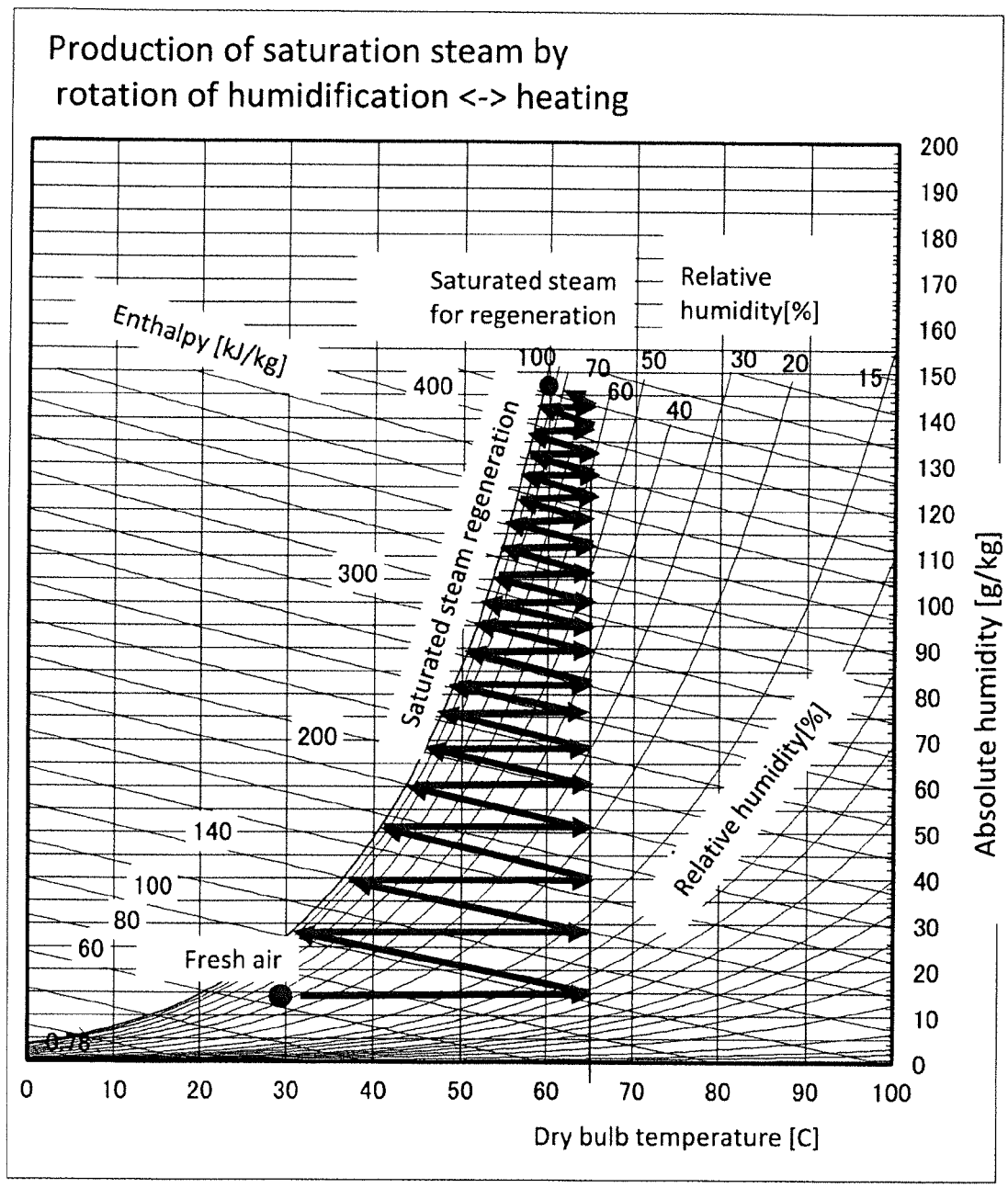
FIG. 14 shows an air diagram of the saturated vapor generation by circulation of evaporation humidification and heating.

As an example, a porous glass fiber sheet is coated with a slurry obtained by mixing fine particles of a solid amine carbon dioxide sorbent having a particle size of 0.1 mm or less and a binder, and the sheet is formed into a sheet of 1 mm or less in size. This makes it possible to realize a vaporization cooling sorption honeycomb which enhances the sorption effect of effectively utilizing the capillary force generated between the fine particles (an example of a sheet surface photograph is shown in FIG. 13). When saturated steam is introduced in the desorption zone, as shown in FIG. 8, the honeycomb absorbs moisture, and water vapor condenses and condenses on its surface. However, although the condensed water is sucked by the capillary force between the multiple micro-particles overlapped in the micro-particle coating layer, due to the honeycomb shape, there is no effect on aeration, the water film on the surface is also thin, the sorption rate is not inhibited. When the air to be processed passes, as shown in FIG. 9, sorption of carbon dioxide gas and evaporation and cooling of water progresses from the inner surface of the wide honeycomb to the inside of the seat. Therefore, the disadvantage which becomes problematic in the layer (floor) filled with relatively large spherical ion exchange resin of 1 to 2 mm as in Patent Document 5 is solved.

Even if there is a difference in sorption speed on the front and back of the seat, a difference in sorption capacity, a difference in amount of condensed water, and uneven evaporation cooling effect, since it is a thin sheet honeycomb, such unevenness is alleviated by the capillary force of the condensed water on the front and back sides and mass transfer and heat transfer due to the diffusion of water vapor. As a result, the performance is improved. Further, by mixing active carbon, hydrophobic zeolite, synthetic adsorbent and VOC adsorbent, contaminants such as VOC and odor can be removed at the same time.

Figure 10:
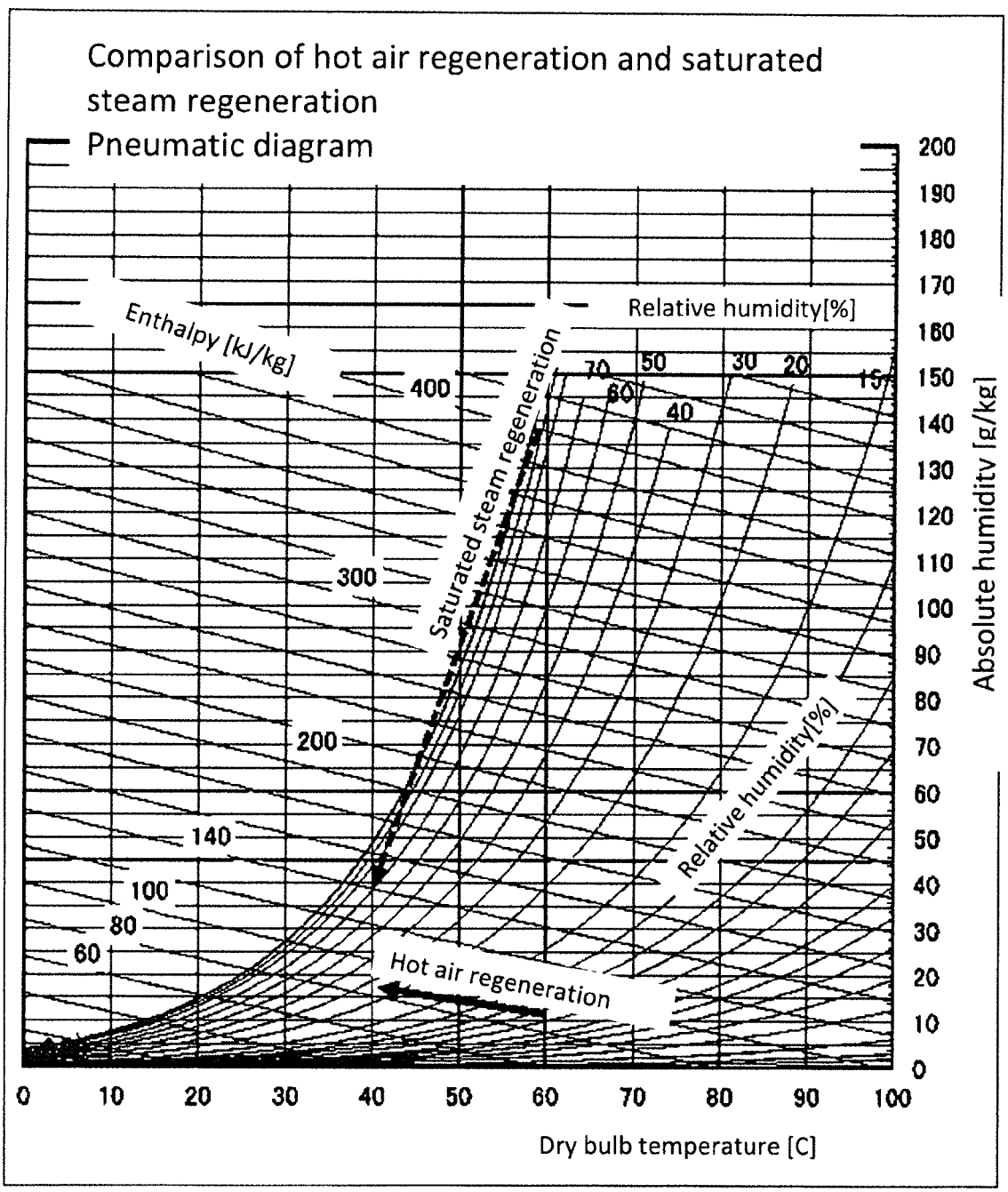
FIG. 10 shows an air diagram which compared warm air reproduction with saturated vapor reproduction.
Figure 11:
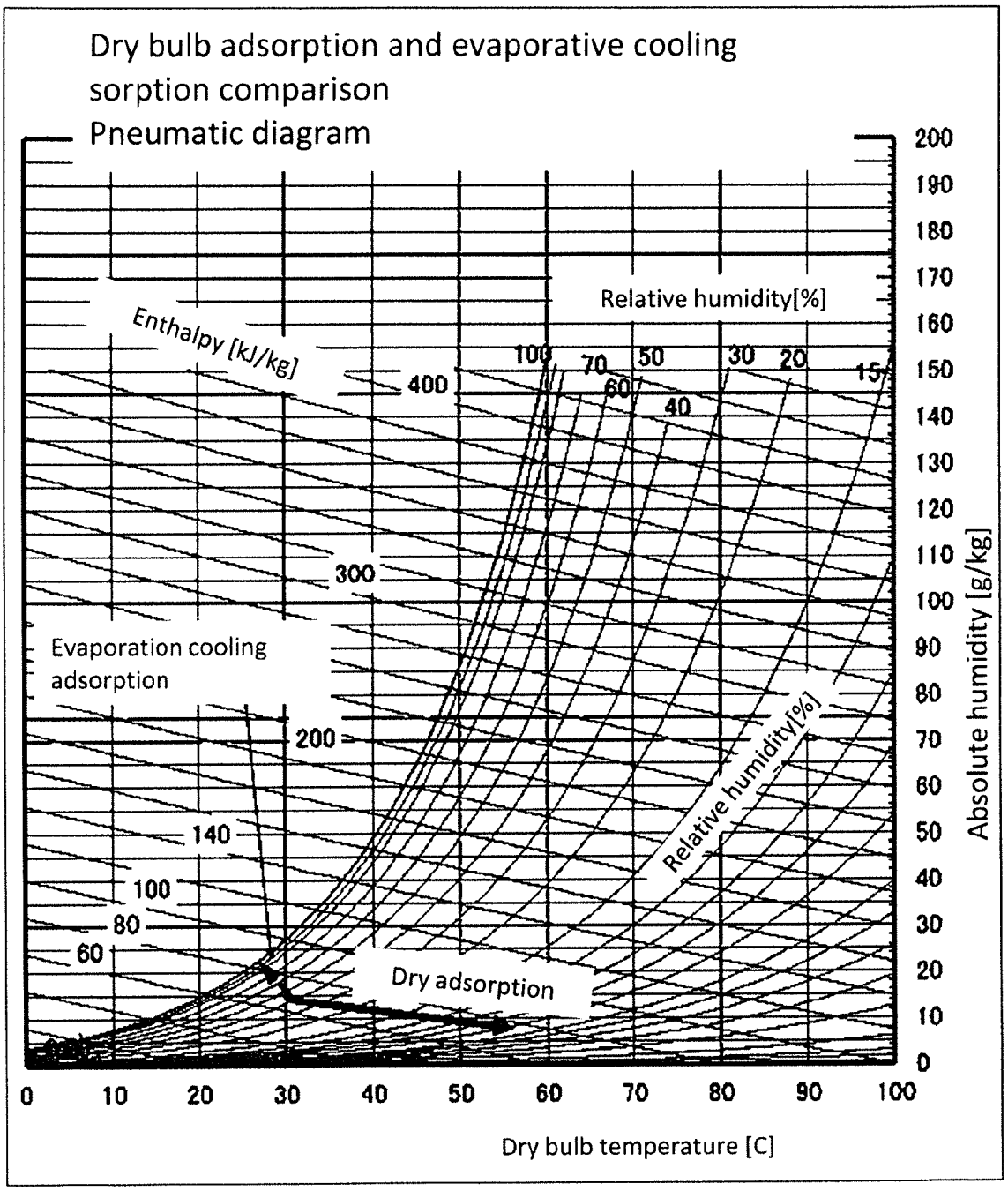
FIG. 11 shows an air diagram which compared dry type adsorption with evaporative cooling sorption.

Further, in the proposed apparatus, durability is improved as long term operation effect. Amine carbon dioxide sorbent materials and amine type ion exchange resins can withstand up to 100° C. in the absence of oxygen, while on the other hand, in oxygenated gas, as an example, even at 50 to 60° C., there are cases where it is remarkably deteriorated. Further, in the apparatus, durability is improved as long term operation effect. Amine carbon dioxide sorbent materials and amine type ion exchange resins can withstand up to 100° C. in the absence of oxygen, while on the other hand, in oxygenated gas, as an example, even at 50 to 60° C., there are cases where it is remarkably deteriorated. In the apparatus, the temperature of the amine sorbent at the time of sorption is suppressed to a low temperature as shown in FIG. 11, and at the time of desorption, it reaches 40 to 100° C. as shown in FIG. 10. However, as the stability of the ion exchange resin is increased in the hydrated state, oxidative deterioration is prevented and durability is improved. In addition, if condensation occurs before or during the re-generation/desorption zone due to the adiabatic loss, it is also possible to control the relative humidity to 90 to 99% by providing an after heater. In short, the main point is to heat the honeycomb inside the honeycomb at the time of re-generation and desorption, thereby lowering the temperature of the air including steam to raise the relative humidity. In this way, conditions are set to cause moisture absorption or condensation inside the honeycomb.

The proposed ventilating apparatus is configured as described above, and its operation will be described below.

In a case where carbon dioxide in the room rises due to carbon dioxide in the exhalation from people in the room or the concentration of carbon dioxide in the room rises due to smoking of people and in a case where carbon dioxide generated by using indoor open stove in the winter, the room air needs to be ventilated.

In recent years, the spread of heat pump air conditioners and the advancement of isolation for smoking, the generation of carbon dioxide other than breath has decreased, but the importance of ventilation remains unchanged.

Figure 3:
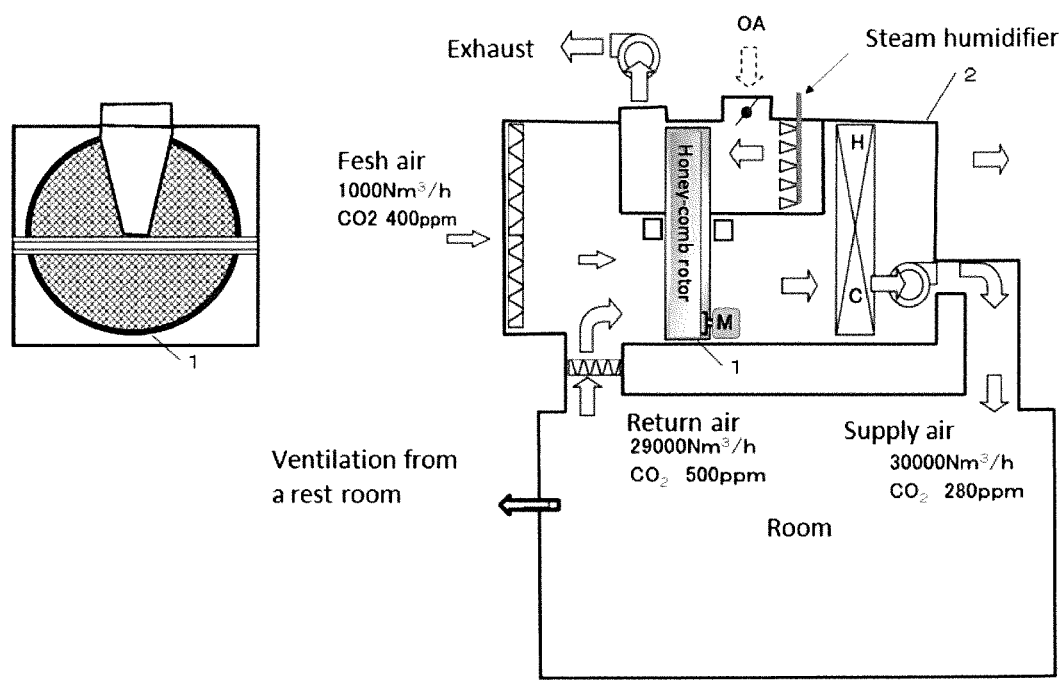
FIG. 3 shows a flow figure a related art ventilation air conditioner according to Patent Document 8.

In such a case, in the present apparatus, indoor air or outside air is passed through the ventilating air conditioner 2 while rotating the honeycomb rotor 1. Air passing through the rotor is supplied with contaminant gas such as carbon dioxide removed. As shown in FIG. 3, when the return air from the room is passed through the honeycomb rotor of the sorption device, the concentration of carbon dioxide and pollutants contained in the ventilation can be reduced to supply air to the room.

At the same time, in the present apparatus, saturated steam is introduced into the desorption/re-generation zone to desorb contaminants such as carbon dioxide adsorbed and release it to the outside air. In this way, the pollutant gas such as carbon dioxide and VOC, SOx, NOx contained in the air to be processed is concentrated and discharged to the outside of the room.

A first embodiment of the proposed ventilating air conditioning apparatus will be described in detail below with reference to FIG. 4. Reference numeral 1 denotes a honeycomb rotor, which is a rotor made of corrugated (corrugated) porous sheet of inorganic fiber such as glass fiber and impregnated with an amine carbon dioxide absorbent which absorbs carbon dioxide an adsorbent of activated carbon is carried. In addition, the rotor carries an adsorbent of activated carbon attached with an amine carbon dioxide absorbent that absorbs carbon dioxide.

The rotor is divided into a processing zone and a desorption re-generation zone, and is housed in a sealed casing. In addition, the rotor is configured to be rotationally driven by a geared motor. In this embodiment, an evaporator of the pre-cooler heat pump is installed in front of the processing zone, and the air to be processed is cooled and dehumidified before being introduced into the processing zone.

In this apparatus, air to be processed is introduced into the processing zone, contaminants such as carbon dioxide contained in the air to be processed are adsorbed and removed, and the purified air is supplied to the room. The air to be processed can be either return air or outside air, and it can be mixed according to the purpose. The rotor honeycomb adsorbed carbon dioxide and pollutants rotates to the desorption re-generation zone, saturated steam at 40 to 100° C. is introduced in the desorption zone, and the honeycomb is heated to desorb and discharge the carbon dioxide and pollutants.

Saturated steam for desorption is generated by directly spraying water onto the condenser coil of the heat pump provided at the inlet of the desorption/re-generation zone and heating and evaporating the water film formed on the heat transfer surface of the coil. The saturated steam introduced into the honeycomb consumes energy for heating of the honeycomb and desorption heat supply such as carbon dioxide and absorbs moisture or dew condensation on the surface inside the honeycomb. Since saturated steam has energy of ten to several tens of times of dry air, the amount of saturated steam introduced can be desorbed and regenerated with less than one tenth of the volume of treated air. As a result, the rotor and the entire apparatus can be downsized. When the amount of heat dissipated in the capacitor coil is insufficient for the amount of heat absorbed (cooling amount) in the evaporator coil, a second capacitor coil is added to the outside to balance.

In the desorption zone, pollutants such as carbon dioxide are heated and desorbed by saturated steam, the water vapor is absorbed by the honeycomb, and the rotor honeycomb in which the water vapor condenses rotates and moves again to the processing zone. At that time, the moisture in the honeycomb evaporates due to the passage of the air to be processed, thereby producing a vaporization cooling effect, and the honeycomb is cooled promptly and sorption of carbon dioxide and pollutants is started. Since the honeycomb is moist even after sorption is started, the heat of sorption of carbon dioxide and pollutants is removed by the evaporative cooling effect and is supplied at a temperature lower than the temperature at the inlet of the air to be processed. The characteristic of the proposed apparatus is that it does not have a dehumidifying function such as a desiccant air conditioner, but since the air to be processed is supplied by being vaporized and cooled, it functions as a cooling device.

Figure 7:
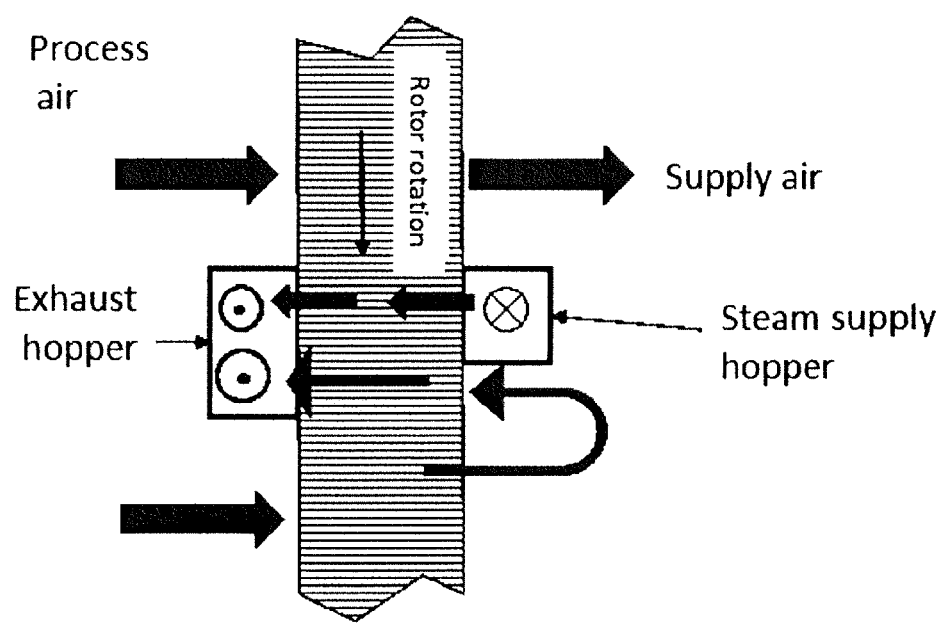
FIG. 7 shows a sectional view of a steam introduction hopper and an exhaust air hopper of Patent Document 8.

A second embodiment will now be described. In this embodiment, the inventor proposes a system which enhances energy saving performance and which can be utilized not only in summer but also in winter time. The second embodiment will be described with reference to FIG. 5. The basic structure of the present embodiment is the same as that of FIG. 4, and a hot water coil is provided at the entrance of the desorption/re-generation zone, and water is directly dropped or sprayed from above into the hot water coil, so that water film is formed and the water film is heated to evaporate the water to obtain saturated steam. The basic structure of the present embodiment is the same as that of FIG. 4, and a hot water coil is provided at the entrance of the desorption/re-generation zone, and water is directly dripped or sprayed from above into the hot water coil. As a result, a water film is formed on the heat transfer surface of the hot water coil, and the water film is further heated to evaporate water to obtain saturated steam. A desirable method for increasing the efficiency of water and energy is to circulate an excess amount of water in the pump P with respect to the water for steam generation accumulated in the lower drain pan. However, when it is circulated for a long period of time, the concentration of dissolved components in feed water, PM brought in due to aeration will rise, so it is desirable to lower the contaminant concentration in circulating water by periodically draining it. As shown in FIG. 7, in the present embodiment, an exhaust zone sector portion to which a purge zone is added is provided on the outlet side of the saturated steam introduction zone on the downstream side of the rotor rotation direction. In the exhaust zone, together with the saturated steam, the air in the supply zone on the opposite side of the exhaust zone is sucked and purged by the exhaust fan and exhausted, at that time, the air volume of the exhaust fan is switched between cooling and heating.

Figure 12:
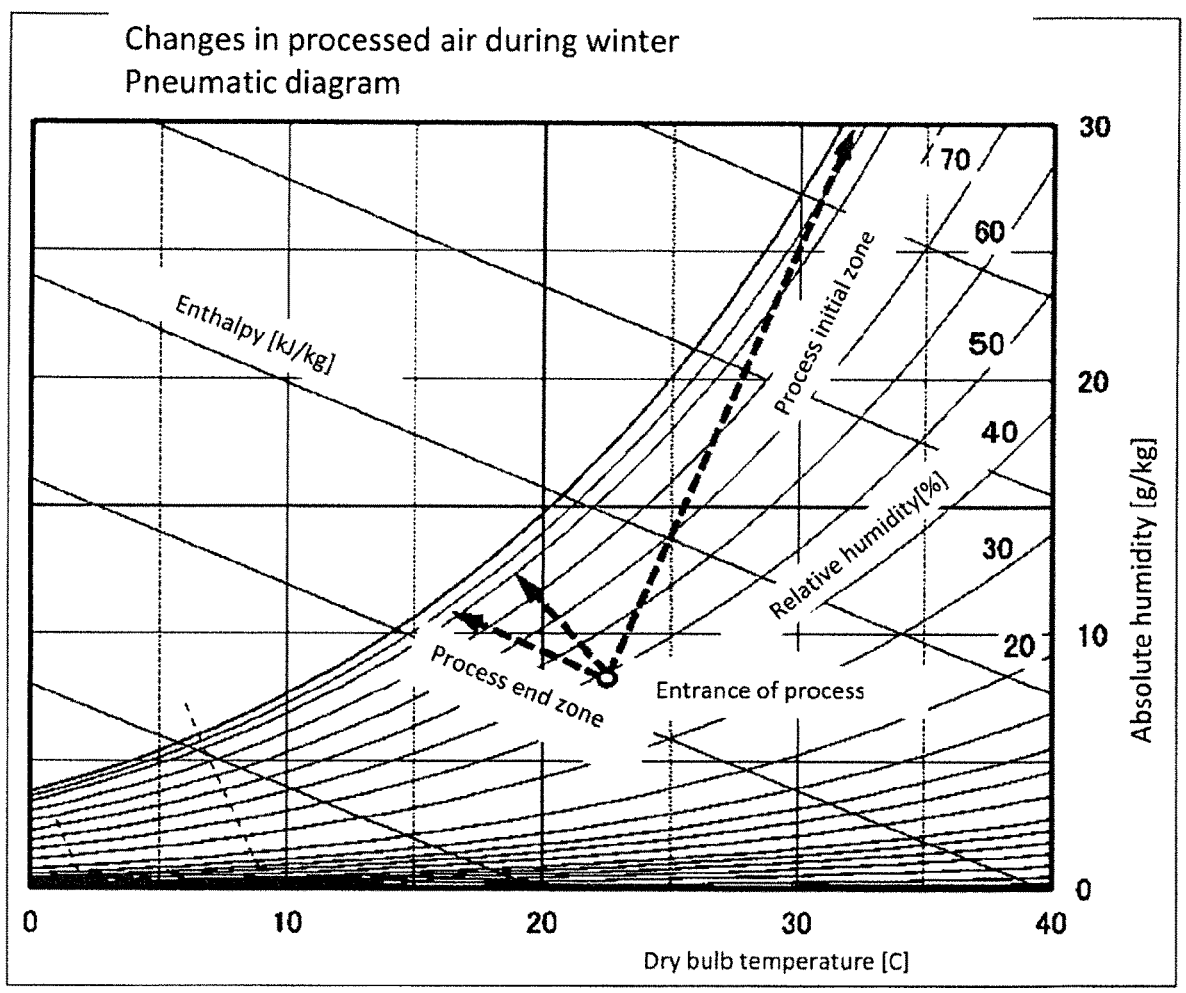
FIG. 12 shows an air diagram of change of winter processing air.

In the present embodiment, at the time of cooling, the amount of air of the exhaust fan is increased to flow an amount of air capable of sufficiently exerting the pre-cooling effect, and the pre-cooled air amount is set so that the pre-cooled honeycomb moves to the treatment zone. In this way, it is possible to prevent bringing the accumulated heat of the rotor into the supply air, and in the processing zone, it is possible to supply the cooled process air with the vaporization cooling effect of the condensed water. Since the rotor honeycomb that has moved to the treatment zone after being vaporized and cooled with pre-cooled air is cooled, the enthalpy of air supply does not rise. Also, since this honeycomb is moist, it does not dehumidify. Therefore, since adsorption heat is not generated from this honeycomb, the temperature of supply air does not rise. In this embodiment, as shown in FIG. 11 and FIG. 12, it has an effect of being able to supply air at a lower temperature than the entrance due to vaporization cooling effect. For example, if the treatment inlet air is 25° C. and 50% RH, the outlet air is vaporized and cooled to a temperature close to a wet-bulb temperature of 18° C. Further, if outside air at 35° C. and 50% RH is to be treated, it is vaporized and cooled to a temperature close to a wet-bulb temperature of 26° C. As described above, in the embodiment of the apparatus, dehumidification is not performed, but dehumidification in this humidity region can be easily adjusted by a heat pump. Therefore, there is no problem with this.

Since the rotor honeycomb that has moved to the processing zone after being vaporized and cooled with pre-cooled air is cooled, the enthalpy of supply air does not rise. Also, since this honeycomb is moist, it does not dehumidify. Therefore, since adsorption heat does not occur from this honeycomb, there is no temperature rise of air supply. In this embodiment, as shown in FIG. 11 and FIG. 12, it has an advantage of being able to supply air at a lower temperature than the entrance due to vaporization cooling effect. For example, if the processing inlet air is 25° C. and 50% RH, the outlet air is vaporized and cooled to a temperature close to a wet-bulb temperature of 18° C. Further, if outside air at 35° C. and 50% RH is to be treated, it is vaporized and cooled to a temperature close to a wet-bulb temperature of 26° C. As described above, in the apparatus, dehumidification is not performed, but dehumidification in this humidity region can be easily adjusted by a heat pump. Therefore, there is no problem with this.

The ventilating apparatus is configured as described above, and its operation will be described below. When a person is present in the room, the carbon dioxide concentration in the room rises due to the carbon dioxide in the person's breath and human smoking. Also, in winter, the concentration of carbon dioxide in the room rises due to carbon dioxide generated using an open-type stove indoors. Therefore, it is necessary to ventilate indoor air. In recent years, the spread of heat pump air conditioners and the advancement of isolation for smoking, the generation of carbon dioxide other than breath has decreased. However, the importance of ventilation does not change.

Figure 4:
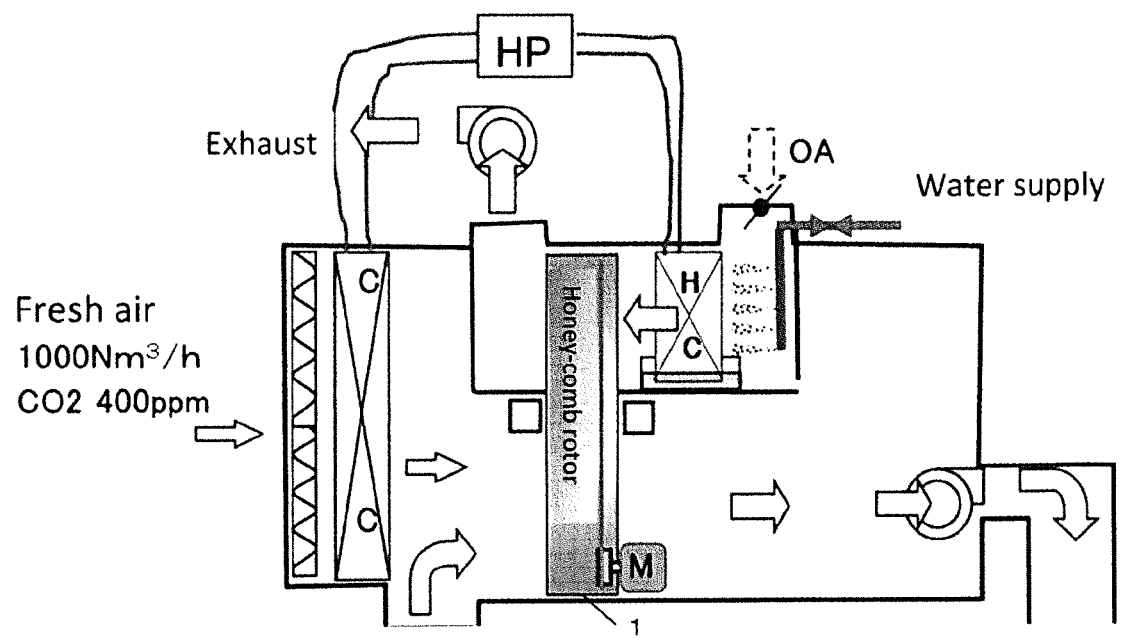
FIG. 4 shows a flow figure of a first preferred embodiment for the proposed ventilation air conditioning apparatus.
Figure 5:
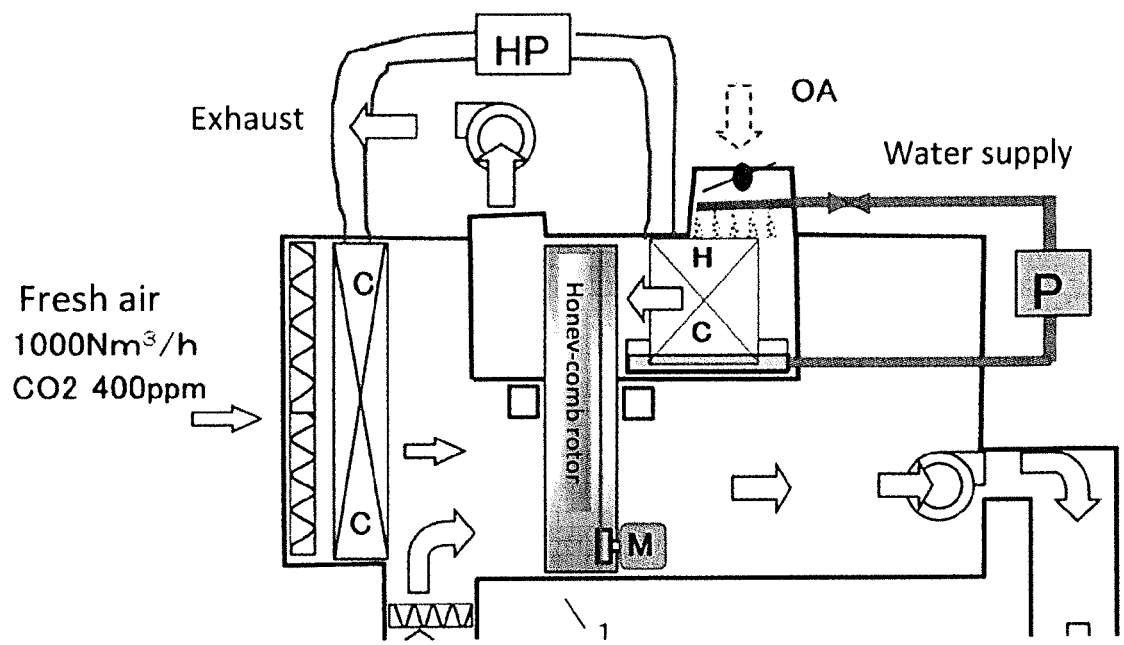
FIG. 5 shows a flow figure of a second preferred embodiment for the proposed ventilation air conditioning apparatus.

In such a case, in the present embodiment, while rotating the honeycomb rotor 1 as shown in FIG. 4, the indoor or outdoor air is passed through the ventilator. The air having passed through the sorption rotor is supplied to the room after the contaminant gas such as carbon dioxide and VOC is removed. When the return air from the room is passed through the honeycomb rotor of the ventilator, the concentration of carbon dioxide and pollutants contained in the return air is reduced and the air can be supplied to the room.

At the same time, water is dropped into the hot water coil provided at the inlet of the desorption/re-generation zone, and the water film formed on the heat transfer surface is evaporated by heating. The generated saturated steam is introduced, and contaminants such as adsorbed carbon dioxide are desorbed and exhausted to the outside air. In this way, carbon dioxide, contaminant gases such as VOC, SOx, NOx and the like contained in the processed air are concentrated and discharged to the outside of the room.

When saturated steam is introduced from the desorption/re-generation zone, the water vapor cools by supplying heat of desorption of carbon dioxide and pollutants while heating the honeycomb. As a result, the water vapor absorbs moisture and condenses on the inner surface of the honeycomb. The moisture on the inner surface of the honeycomb shows a positive effect in the next processing zone. Regarding the first advantage of moisture absorbing water and/or dew condensation water, its sorption ability is poor since the honeycomb immediately after desorption is high temperature. However, as the moisture in the honeycomb evaporates due to the air to be processed and takes away the latent heat of vaporization, the honeycomb quickly cools the air and starts sorption.

Figure 6:
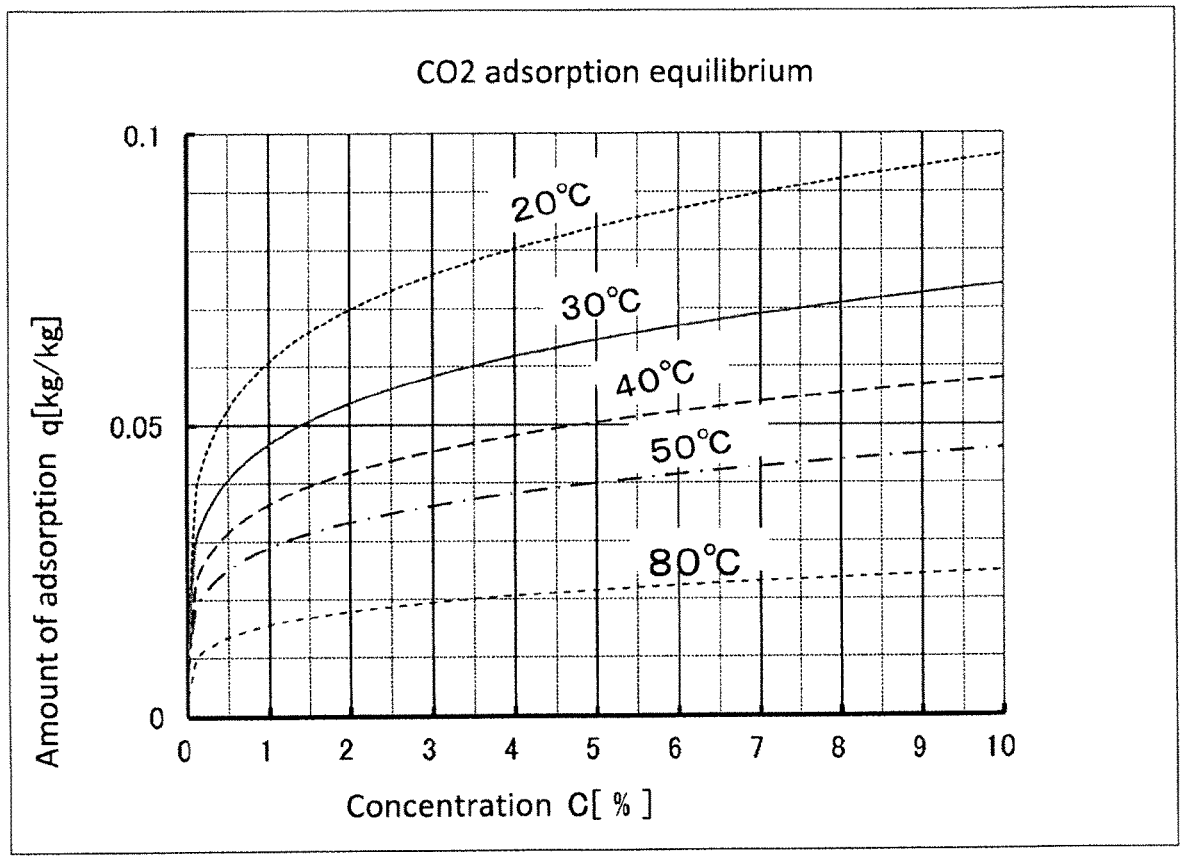
FIG. 6 shows a carbon dioxide adsorption equilibrium diagram of a solid amine system sorption material.

The second advantage of moisture adsorbing water and/or condensation water will be described below. Sorption heat is generated due to sorption of pollutants such as carbon dioxide in the air to be processed. Also, in the dry state operation as in Patent Documents 3, 4 and 6, the air temperature rises as in the dry adsorption of FIG. 11, and adsorptive power decreases. However, in the apparatus, the heat of sorption is converted into latent heat by evaporative cooling of the moisture on the surface of the honeycomb, and the temperature rise is suppressed as in vaporization cooling sorption of FIG. 11, and the sorption performance is improved. In other words, when treating air is allowed to flow through the rotor and carbon dioxide is adsorbed in the honeycomb, if the sorption material or the raw material gas rises in temperature due to sorption heat, the sorption amount decreases as shown in FIG. 6. However, in this embodiment, the temperature of the air to be processed is lowered by the vaporization cooling effect of moisture, and at the same time, the sorption heat generated by the sorption of carbon dioxide is also removed by vaporization cooling. Therefore, the temperature rise of the honeycomb and the raw material gas is suppressed, and the pollutant gas such as carbon dioxide can be adsorbed with high efficiency. For example, when outside air at 35° C. and 50% RH is introduced, the passing air and the honeycomb generate a vaporization cooling effect so as to approach the wet-bulb temperature of 26° C. at this time. Further, if returning at 25° C. and 50% RH, the vaporization cooling effect occurs so as to approach the wet-bulb temperature of 18° C.

The third advantage of moisture absorption and/or condensation water will be described below. The carbon dioxide adsorbing material such as amine type ion exchange resin absorbs moisture by hydration of the ion exchange group, and the carbon dioxide sorption ability becomes higher in the hygroscopic state than in the dry state. Therefore, also in that sense, there is an advantage of improving sorption performance. Also, the sorption material of carbon dioxide has higher stability in the hydrated state. Accordingly, heat resistance and oxidation resistance are also improved. The same advantage is also obtained when impregnating an amine type absorbent into activated carbon or the like, and it has an advantage of improving the durability of the amine type absorbent.

Oxygen in the indoor air is consumed by the person in the room, but as mentioned above, oxygen is present in the atmosphere by about 21%, and consumption by about 1 to 2% is not a problem in particular. However, 1-2% of carbon dioxide discharged at the same time as oxygen consumption is a fatal concentration for humans. When the inside of the room becomes negative pressure due to discharge of pollutants such as carbon dioxide and VOC concentrated and desorbed, outside air enters as draft wind from windows and doors, or oxygen is supplied by diffusion due to concentration difference. That is, the outside air is supplied as the draft air in an amount substantially equal to the amount of the pollutant exhaust gas discharged to the outside of the room. Since there is nearly 21% oxygen in this, there is no shortage of oxygen.

Since the concentration of carbon dioxide in the exhaust gas of the ventilating apparatus according to the proposals is high, when the exhaust gas is introduced to a growing room of a plant factory such as a vinyl house, the growth of the plant becomes faster and the discharge of carbon dioxide to the atmosphere can be suppressed.

In this way, waste of energy can be greatly reduced as compared with a device or a method for discharging a large amount of air to the outside so as to exhaust only a few ppb to several hundred ppm of contaminants in a room. Further, in a case where a carbon dioxide sensor is provided, if saturated steam is introduced to perform desorption re-generation operation only when the carbon dioxide concentration becomes equal to or higher than a predetermined value, it is possible to further waste energy.

As described above, in the present embodiment, since the desorption re-generation is performed by saturated steam generated by using the exhaust heat, energy saving performance is improved and contaminants such as carbon dioxide and VOC in the room are reduced by the small amount of ventilation, and It can be discharged and energy loss caused by ventilation can also be prevented. As described above, in this embodiment, since the desorption and the re-generation are performed by the saturated water vapor generated by using the exhaust heat, the energy saving performance is improved. In addition, since pollutants such as carbon dioxide and VOC in the room are discharged by a small amount of ventilation, it is possible to prevent energy loss by ventilation. Also, even if pollutants are contained in the outside air, the amount of intrusion into the room is kept to a minimum because the amount of ventilation is small, and contaminants entering from local ventilation, doors, etc. pass through the rotor. Therefore, there is no problem in the contaminants.

The inventor's proposals provide a ventilating apparatus capable of releasing pollutants such as carbon dioxide and VOC in a room with a small amount of ventilation. In addition, the proposals provide a space-saving energy-saving ventilating air conditioning apparatus that can utilize waste heat to prevent energy loss caused by ventilation.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A ventilating air conditioning apparatus comprising:
   a honeycomb rotor having a sorbent that sorbs carbon dioxide and contaminants;
   a rotor rotating device having at least a processing zone and a re-generation/desorption zone, the honeycomb rotor being disposed in the rotor rotating device; and
   a heat exchanger provided at an entrance of said re-generation/desorption zone, wherein
   the ventilating air conditioning apparatus is configured such that air to be processed is passed through said processing zone to remove carbon dioxide and contaminants and produce supply air,
   the ventilating air conditioning apparatus is configured such that water is directly sprayed on or dropped into the heat exchanger provided at the entrance of said re-generation/desorption zone, to form a water film on the heat exchanger, to evaporate the water film with heat from the heat exchanger, and to generate saturated steam,
   the ventilating air conditioning apparatus is configured such that the saturated steam is introduced to the re-generation/desorption zone to desorb the carbon dioxide and contaminants and produce a discharge stream that is vented outdoors, and
   the ventilating air conditioning apparatus is configured such that said honeycomb rotor is in a wet state due to at least one of moisture absorption and water condensation, when said honeycomb rotor moves from the re-generation/desorption zone to the processing zone by rotation of the honeycomb rotor.

2. The ventilating air conditioning apparatus according to claim 1, wherein
   the ventilating air conditioning apparatus is configured such that excess water is sprayed on or dropped into the heat exchanger such that water exits from said heat exchanger, and
   a pump recirculates water exiting from said heat exchanger such that the water is again sprayed on or dropped into said heat exchanger.

3. The ventilating air conditioning apparatus according to claim 1, wherein said heat exchanger is a warm water coil.

4. The ventilating air conditioning apparatus according to claim 3, wherein
   the ventilating air conditioning apparatus is configured such that excess water is sprayed on or dropped into the heat exchanger such that water exits from said heat exchanger, and
   a pump recirculates water exiting from said heat exchanger such that the water is again sprayed on or dropped into said heat exchanger.

5. The ventilating air conditioning apparatus according to claim 1, wherein said heat exchanger is a condenser coil of a direct expansion heat pump.

6. The ventilating air conditioning apparatus according to claim 5, wherein
   the ventilating air conditioning apparatus is configured such that excess water is sprayed on or dropped into the heat exchanger such that water exits from said heat exchanger, and
   a pump recirculates water exiting from said heat exchanger such that the water is again sprayed on or dropped into said heat exchanger.

7. The ventilating air conditioning apparatus according to claim 5, wherein
   the heat pump has an evaporator and the condenser coil, and
   the evaporator of the heat pump is positioned upstream from the processing zone to cool and dehumidify the air to be processed before the air to be processed is passed through the processing zone.

8. The ventilating air conditioning apparatus according to claim 1, wherein
   said heat exchanger is a plate sensible heat exchanger having a high temperature side and a low temperature side,
   exhaust gas is passed through the high temperature side, and
   the water is directly sprayed on or dropped into the low temperature side to generate the saturated steam.

9. The ventilating air conditioning apparatus according to claim 8, wherein the ventilating air conditioning apparatus is configured such that excess water is sprayed on or dropped into the heat exchanger such that water exits from said heat exchanger, and a pump recirculates water exiting from said heat exchanger such that the water is again sprayed on or dropped into said heat exchanger.

10. The ventilating air-conditioner according to claim 1, wherein a heater is provided at a rear stage of the heat exchanger to reheat the saturated steam used to desorb carbon dioxide and contaminants, the heater being provided between the heat exchanger and said honeycomb rotor.

11. The ventilating air conditioning apparatus according to claim 1, wherein a purge zone is provided downstream from the re-generation/desorption zone in a rotating direction of the honeycomb rotor, on an outlet side of the re-generation/desorption zone, the purge zone being supplied with air, and an exhaust is provided on a side of the honeycomb rotor opposite to the purge zone, the exhaust having an exhaust blower to exhaust both air supplied to the purge zone and saturated steam introduced to the re-generation/desorption zone, using suction.

12. The ventilating air conditioning apparatus according to claim 11, wherein the ventilating air conditioning apparatus is configured such that the air supplied to the purge zone is a portion of the supply air that is produced by passing the air to be processed through the processing zone.

13. The ventilating air conditioning apparatus according to claim 1, wherein the ventilating air conditioning apparatus is configured such that the saturated steam introduced to the re-generation/desorption zone is steam at atmospheric pressure and at 40 to 100° C.

14. The ventilating air conditioning apparatus according to claim 1, wherein the honeycomb rotor carries a solid amine carbon dioxide sorbent having a particle diameter of 0.1 mm or less.

15. The ventilating air conditioning apparatus according to claim 1, wherein the honeycomb rotor carries activated carbon in which an amine type sorbent is impregnated in the pores.

16. The ventilating air conditioning apparatus according to claim 1, wherein the ventilating air conditioning apparatus is configured such that the contaminants sorbed by the sorbent comprise volatile organic compound (VOC) gas contaminants.

* * * * *

UNITED STATES PATENT AND TRADEMARK OFFICE
CERTIFICATE OF CORRECTION

PATENT NO. : 11,058,988 B2  
APPLICATION NO. : 16/229728  
DATED : July 13, 2021  
INVENTOR(S) : Hiroshi Okano Page 1 of 1

It is certified that error appears in the above-identified patent and that said Letters Patent is hereby corrected as shown below:

On the Title Page

Item [30], insert:
-- Dec. 25, 2017 (JP) .................... 2017-247165 --

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*